Patented Aug. 26, 1952

2,608,570

UNITED STATES PATENT OFFICE 2,608,570

PREPARATION OF ORGANIC PERESTERS

Denham Harman, Berkeley, Calif., assignor to Shell Development Company, San Francisco, Calif., a corporation of Delaware No Drawing. Application October 19, 1948, Serial No. 55,442

12 Claims. (Cl. 260—453)

This invention relates to an improved process for the production of organic peresters. More particularly, the invention provides a general reaction by which a wide variety of different organic peresters can be produced, and provides a novel class of peresters the synthesis of which, by the methods heretofore known, would be tedious and difficult.

Organic peresters have proven to be valuable for many applications, particularly in the initiation or catalysis of polymerization and addition reactions. Although the name and structural formula of the organic peresters would imply it, they are not in the ordinary sense alcohol esters of peroxy acids and cannot be prepared by many of the ordinary esterification reactions. Heretofore, organic peresters have been produced only by reactions such as those of a barium salt of a hydroperoxide with an acyl chloride, or a hydroperoxide with an acyl halide in the presence of a base such as pyridine. In contrast to the esters of carboxylic acids, they have not been successfully produced by reactions of the hydroperoxides with the corresponding acids.

I have now discovered that peresters can be produced as the principal product of an addition reaction by contacting at a temperature at which they are stable, a hydroperoxide of the class consisting of alkyl hydroperoxides, aralkyl hydroperoxides and halogen-substitution products of the same and a ketene or its dimer.

Hydroperoxides illustrative of the various types which can be so employed according to the invention include: tertiary-butyl hydroperoxide, alpha, alpha - dimethylbenzyl hydroperoxide, chloro-tertiary-butyl hydroperoxide, 1-hydroxyheptyl hydroperoxide and oleyl hydroperoxide. A preferred class of starting materials for the present process are hydrocarbon hydroperoxides (compounds of the type R₃COOH in which R represents a hydrogen atom, a saturated aliphatic hydrocarbon radical, or a saturated aliphatic hydrocarbon radical which contains aryl groups) which are free of aliphatic multiple bonds and which contain from 2 to 14 carbon atoms as well as their halogen-containing analogs. Examples of hydroperoxides of the preferred class include: saturated aliphatic hydroperoxides such as tertiary-butyl hydroperoxide, 1-methyloctyl hydroperoxide, and tetradecyl hydroperoxide; aromatic hydroperoxides such as alpha,alpha-dimethylbenzyl hydroperoxide, para-tolylmethyl hydroperoxide and mesityl-tertiary-butyl hydroperoxide; and halogen-containing hydroperoxides such as chloro-tertiary-butyl hydroperoxide, beta-bromo-tertiary-amyl hydroperoxide and alpha,alpha-dimethyl-para-chlorobenzyl hydroperoxide. The tertiary-alkyl and the aryl-tertiary-alkyl hydroperoxides are a particularly preferred class of starting materials for the process of the invention.

Any ketene which is capable of existence as a monomer or dimer in the pure form or diluted with an inert solvent can be converted to a perester in accordance with the process of the invention. Illustrative examples of suitable ketenes include: ketene; dialkylketenes such as dimethylketene, methylethylketene, diisopropylketene and dodecylethylketene; diarylketenes such as diphenylketene, dibenzylketene, dimesitylketene, phenyl-para-tolylketene, di-para-tolylketene and mesitylphenylketene; arylalkylketenes such as methylbenzylketene, ethylphenylketene; aldoketenes such as mesitylketene; diketenes such as acetylketene, and ketenes containing additional functional groups such as ethylchloroketene, ethylbromoketene, and ethylcarbophenoxyketene. In general, ketenes of from 1 to 20 carbon atoms in which a hydrocarbon nucleus contains the C=C=O group and in which the C=C=O group contains the only aliphatic multiple bonds, are preferred, particularly ketene and the ketoketenes. Ketene and its dialkyl homologs of from 1 to about 16 carbon atoms are especially suitable.

In its essence, the process of the invention simply comprises bringing materials of the defined classes into intimate contact. The process is preferably conducted as a batchwise or continuous liquid-phase operation. The ketene is preferably added to a solution of the hydroperoxide in from about one-third to ten parts by weight of an inert solvent. The ketene may be added as a pure compound, preferably as a vapor, or in the form of a solution preferably in from about one-third to ten parts by weight of an inert solvent.

Inert solvents which may be suitably employed in the process of the invention include: ethers such as diethyl ether, dipropyl ether and dioxane; esters such as methyl acetate, ethyl benzoate and isopropylbutyrate; and hydrocarbons such as pentane, nonane and toluene.

The process of the invention may be conducted at any temperature at which the individual reactants are stable. In general, increasing the reaction temperature increases the rate of reaction. Temperatures of from about 0° C. to about 50° C. comprise a preferred range in which to conduct the process.

The process is well adapted to operation under atmospheric pressure and while the employment of pressures above or below atmospheric pressure has no adverse effect, its operation under atmospheric pressure is preferred.

The process of the invention does not depend upon the presence of a catalyst. However, it has been found that in the case of the hydroperoxides which are stable in the presence of an inorganic acid, the presence of a trace of an acid such as sulfuric, or hydrochloric acid promotes a more rapid reaction.

The proportions in which the reactants can be employed can be varied from about 1 to 10 parts of hydroperoxide to from 1 to 10 parts of ketene. However, good yields are obtained by employing the reactants in equimolar proportions, and the use of such proportions is preferred.

A particularly important feature of the present invention is the provision of a novel class of organic peresters the synthesis of which would be tedious and difficult by the methods heretofore known—namely, the esters of aryl-substituted peracetic acids such as methyl, phenylmethylperacetate and tertiary-butyl diphenylperacetate. Esters of acetylperacetic acid such as tertiary-butyl acetylperacetate which have particularly valuable properties in the initiation of polymerization and addition reactions also can be prepared according to the process of the invention.

The following examples are presented to illustrate in detail the application of the process of the invention to the preparation of various peresters, and the employment of particular starting materials representative of various classes of suitable reactants. However, the invention is not limited to the particular materials and reaction conditions recited in the examples.

*Example I*

Tertiary-butyl peracetate is prepared in accordance with the process of the invention by passing gaseous ketene at the rate of 0.36 mole per hour into 45 grams of tertiary-butyl hydroperoxide containing a trace of sulfuric acid (0.1 cc. of a 50% by weight aqueous solution of the acid) and maintained at a temperature of between 0° C. to 30° C.

The perester is isolated by diluting the reaction mixture with pentane, extracting the unreacted hydroperoxide with water and removing the solvents by vacuum distillation.

A sample of tertiary-butyl peracetate was prepared in a 70% yield in the above manner and was identified by the following analysis:

|  | Found | Calculated for $C_6H_{12}O_3$ |
|---|---|---|
| Mol. weight (cryo-dioxane) | 128±2% | 132 |
| Percent Carbon | 55.2 | 54.5 |
| Percent Hydrogen | 9.4 | 9.1 |

*Example II*

Tertiary-butyl acetylperacetate is prepared in accordance with the process of the invention by passing acetylketene (the dimer of ketene) at a rate of 0.5 mole per hour into 45 grams of tertiary-butyl hydroperoxide maintained at a temperature of between 0° C. and 50° C. for one hour. The perester is isolated by diluting the reaction mixture with pentane, removing the unreacted hydroperoxide by extraction with water and removing the solvent by vacuum distillation.

A sample of tertiary-butyl peracetate was prepared in the above manner and the presence of the perester in the reaction product was established by the observation that the product liberated substantially the theoretical amount of iodine from hydrogen iodide in glacial acetic acid.

*Example III*

Alpha,alpha-dimethylbenzyl peracetate is prepared in accordance with the process of the invention by passing gaseous ketene at the rate of 0.36 mole per hour into 50 grams of alpha,alpha-dimethylbenzyl hydroperoxide in 50 grams of cumene maintained at a temperature of between 0° C. and 40° C.

The perester is isolated by removing the unreacted hydroperoxide by extraction with dilute caustic and removing the solvents by vacuum distillation.

*Example IV*

Tertiary-butyl diphenylperacetate is prepared in accordance with the process of the invention by adding a solution of 38.4 grams of diphenylketene in 100 grams of pentane to 18 grams of tertiary-butyl hydroperoxide containing a trace of sulfuric acid and maintained at a temperature of between 0° C. and 30° C.

The perester is isolated by removing the unreacted hydroperoxide by extraction with water and removing the solvents by a vacuum distillation.

*Example V*

Tertiary-amyl phenylmethylperacetate is prepared in accordance with the process of the invention by adding a solution of 26.2 grams of phenylmethyl ketene in 100 grams of pentane to 18 grams of tertiary-amyl hydroperoxide containing a trace of sulfuric acid and maintained at a temperature of between 0° C. and 30° C.

The perester is isolated by removing the unreacted hydroperoxide by extraction with water and removing the solvents by vacuum distillation.

*Example VI*

Bromo-tertiary-butyl peracetate is prepared in accordance with the process of the invention by passing gaseous ketene at the rate of 0.36 mole per hour into 61 grams of bromo-tertiary-butyl hydroperoxide in 100 grams of cumene maintained at a temperature of between 0° C. and 40° C. for one hour.

The perester is isolated by removing the unreacted hydroperoxide by extraction with dilute caustic and removing the solvents by vacuum distillation.

*Example VII*

Tertiary-butyl ethylchloroperacetate is prepared in accordance with the process of the invention by passing gaseous ethylchloroketene at the rate of 0.5 mole per hour into 45 grams of tertiary-butyl hydroperoxide in 100 grams of cumene maintained at a temperature of between 0° C. and 50° C.

The perester is isolated by removing the unreacted hydroperoxide by extraction with water and removing the solvents by vacuum distillation.

The invention claimed is:

1. A process for the production of tertiary-butyl peracetate which comprises passing ketene into tertiary-butyl hydroperoxide containing a trace of sulfuric acid at a temperature of from about 0° C. to about 50° C.

2. A process for the production of alpha,alpha-dimethylbenzyl peracetate which comprises passing ketene into alpha,alpha-dimethylbenzyl hydroperoxide at a temperature of from about 0° C. to about 50° C.

3. A process for the production of tertiary-butyl diphenylperacetate which comprises passing diphenylketene into tertiary-butyl hydroperoxide at a temperature of from about 0° C. to about 50° C.

4. Tertiary-butyl diphenylperacetate.

5. A tertiary alkyl ester of an aryl-substituted peracetic acid.

6. A process for the production of an ester of an aryl-substituted peracetic acid which comprises contacting at a temperature of from about 0° C. to about 50° C. an aryl-substituted ketene with an organic hydroperoxide of the class consisting of alkyl hydroperoxides, aralkyl hydroperoxides and halogen-substitution products of the same.

7. A process for the production of a tertiary-alkyl peracetate which comprises reacting a tertiary-alkyl hydroperoxide with ketene in the presence of a strong mineral acid at a temperature within the range of from about 0° C. to about 50° C.

8. A process for the production of a tertiary-alkyl peracetate which comprises passing gaseous ketene into contact with tertiary-butyl hydroperoxide in liquid phase at a temperature within the range of from about 0° C. to about 50° C.

9. A process for the production of an dialkylarylmethyl peracetate which comprises reacting an dialkylarylmethyl hydroperoxide with ketene in the presence of a strong mineral acid at a temperature within the range of from about 0° C. to about 50° C.

10. A process for the production of an organic perester which comprises reacting an organic hydroperoxide of the class consisting of alkyl hydroperoxides, aralkyl hydroperoxides and halogen-substitution products of the same with a ketene in the presence of an acidic catalyst.

11. A process for the production of an organic perester which comprises bringing a ketene and an organic hydroperoxide of the class consisting of alkyl hydroperoxides, aralkyl hydroperoxides, and halogen-substitution products of the same into contact at a temperature within the range of from about 0° C. to about 50° C.

12. A process for the production of an organic perester which comprises reacting an organic hydroperoxide of the class consisting of alkyl hydroperoxides, aralkyl hydroperoxides and halogen-substitution products of the same with a ketene in the presence of an acidic catalyst at a temperature within the range of from about 0° C. to about 50° C.

DENHAM HARMAN.

REFERENCES CITED

The following references are of record in the file of this patent:

UNITED STATES PATENTS

| Number | Name | Date |
|---|---|---|
| 2,319,057 | Hanford | May 11, 1943 |
| 2,362,648 | Lichty et al. | Nov. 14, 1944 |
| 2,403,709 | Dickey | July 9, 1946 |

OTHER REFERENCES

Staudinger: Ber. Deut. Chem., vol. 44, page 539, (1911).

Naylor: J. Chem. Soc. (1945), pp. 244–245.

Milas et al.: "Jour. Am. Chem. Soc.," vol. 68 (1946), pages 642–643.